United States Patent [19] [11] 4,356,202
Todd [45] Oct. 26, 1982

[54] WRAP FOOD COATING MIX AND METHOD OF USING

[75] Inventor: John M. Todd, Toronto, Canada

[73] Assignee: General Foods Inc., Canada

[21] Appl. No.: 313,071

[22] Filed: Oct. 19, 1981

[51] Int. Cl.$^3$ ............................................. A21D 13/00
[52] U.S. Cl. .................................... 426/138; 426/289; 426/295; 426/296; 426/412; 426/573; 426/652
[58] Field of Search ............... 426/138, 289, 295, 296, 426/412, 573, 652

[56] References Cited

U.S. PATENT DOCUMENTS

| | | |
|---|---|---|
| 2,910,370 | 10/1959 | Rogers et al. |
| 3,042,532 | 7/1962 | Daline .............................. 426/412 X |
| 3,062,664 | 11/1962 | Pollock ........................... 426/138 X |
| 3,468,675 | 9/1969 | Pötzl ............................... 426/573 X |
| 3,586,512 | 6/1971 | Mancuso et al. |
| 3,676,158 | 7/1972 | Fischer et al. |
| 3,723,137 | 3/1972 | Fischer et al. |
| 4,098,913 | 7/1978 | Baugher ........................... 426/652 X |
| 4,104,408 | 8/1978 | Chiu .................................... 426/135 |
| 4,208,442 | 6/1980 | Evans et al. ........................ 426/296 |

FOREIGN PATENT DOCUMENTS 47-14904 4/1972 Japan ................................... 426/412

*Primary Examiner*—Robert L. Lindsay, Jr.
*Attorney, Agent, or Firm*—Thomas A. Marcoux; Thomas R. Savoie; Daniel J. Donovan

[57] ABSTRACT

The invention comprises a composition in pliable sheet form for wrapping a foodstuff to provide an edible coating and a fried appearance, taste and texture upon baking comprising an intimate admixture of a fat, water and a particulate farinaceous material suspended in a pliable sheet form by a gelatin matrix. The invention also includes a method of baking a foodstuff comprising wrapping said foodstuff in said sheet material and baking the same.

17 Claims, No Drawings

WRAP FOOD COATING MIX AND METHOD OF USING

TECHNICAL FIELD

The present invention relates to an edible coating and wrapping composition in sheet form for application to foodstuffs prior to baking to enhance the appearance, taste, odor and texture of the baked food and to impart thereto a fried taste, texture and appearance.

BACKGROUND ART

Many foods such as meat, fish, poultry, etc. are coated (breaded) prior to cooking by pan-frying or deep fat-frying. For this type of cooking, the food is dusted with a light coating of flour or breadcrumbs, which on frying, develops into a crispy, savory, brown colored coating.

Recently, in order to avoid the danger, messiness, and the unfavorable dietary aspects associated with fried foods but also to develop the appealing odor, taste, flavor, texture and appearance resulting from this manner of preparing food, coatings have been developed and applied to the surfaces of food which give a fried food appearance when the product and food are baked in an oven. A backed product of the aforementioned type is disclosed by Rogers et al. (U.S. Pat. No. 2,910,370) who prepare frozen poultry coated with a flavored batter consisting of bread, flour and water. The batter-coated food is treated with a supplementary fat coating and frozen. The breading and fat are selected to impart a brown color to the foodstuff when it is baked. Preparation of the coated food for consumption involves removing it from the freezer and baking it in an oven at high temperature until the product takes on a color approaching that of pan browned or deep fat-fried food.

The coatings and coated foodstuffs of the prior art, however, have certain pronounced deficiencies which are manifested by a dark brown unappealing color prior to baking and a waxy mouthfeel. With respect to Rogers et al., extended cooking periods are necessary because of the frozen nature of the food. Moreover, a limited selection of foodstuffs which can be coated and the inapplicability to fresh vegetables, fish and certain meats are additional drawbacks.

To overcome the deficiencies of the prior art, Mancuso et al. (U.S. Pat. No. 3,586,512) developed a composition for coating a foodstuff prior to baking to impart a fried appearance thereto comprising a food dye, edible fat and a farinaceous material. The composition comprises a dry, flowable mix which is applied to the foodstuff by shaking in a closed envelope or sack after wetting of the surfaces thereof. The thus coated foodstuff is then baked or otherwise subjected to heat to cook the product and impart thereto a fried appearance.

Although the Mancuso et al. product solved most of the disadvantages associated with the prior art products, there still exists a need for a product capable of imparting a fried appearance to baked foodstuffs requiring little or no preparation by the consumer.

Accordingly, it is an object of the present invention to provide a composition and method for imparting a fried appearance, taste and odor to baked foodstuffs which require little or no manipulative preparation by the ultimate consumer.

DISCLOSURE OF THE INVENTION

The present invention comprises a coating and wrapping composition in pliable sheet form for utilization by the consumer to impart to a wide variety of foodstuffs which are baked, the appearance, texture, flavor, aroma and characteristics of fried food. The foodstuff is wrapped in the pliable sheet of this invention and baked. The coating and wrapping composition can be packaged and directly sold to the consumer. The coating and wrapping composition of this invention requires no processing, preparation or combining of ingredients by the consumer other than to merely wrap the foodstuff in the pliable sheet composition of the invention and subject the foodstuff to baking temperatures. Thus, there is no need for prior wetting of the foodstuff surfaces nor shaking in a bag or envelope with a particulate material as in the Mancuso et al. patented process prior to cooking.

The coating and wrapping composition in pliable sheet form comprises an intimate admixture of a fat, water, gelatin and a particulate farinaceous material. The sheet material is formed by suspending said particulate farinaceous material in an aqueous suspension of fat and gelatin and molding the resulting coherent mass into the desired pliable sheet form. Upon wrapping a foodstuff with the pliable coating and wrapping sheet composition, a product is produced which is capable of being baked to yield a cooked product having the appearance, taste, texture, aroma and other characteristics of a fried food.

BEST MODE FOR CARRYING OUT THE INVENTION

The coating and wrapping composition of the present invention comprises an intimate admixture of a fat, water and particulate farinaceous material suspended in a pliable sheet formed by a gelatin matrix. The coating and wrapping composition will contain from 0.5 to 40% gelatin by weight of the composition, preferably from 1 to 20%; from 2 to 30% fat by weight of the composition, preferably from 5 to 25%; from 25 to 75% farinaceous material by weight of the composition, preferably from 30 to 55%; and from 10 to 70% water by weight of the composition, preferably from 15 to 40%.

Any edible fat may be utilized in preparing the composition of the present invention. Suitable fat materials include those of animal or vegetable origin, hydrogenated or non-hydrogenated, for example, soybean, cottonseed, corn, peanut, coconut, palm oils or lard or blends thereof. These fats can be powdered for ease of handling. Preferably the fat should have a capillary melting point of from 109° F. to 112° F. (Approximately 43° C. to 45° C.) The coating and wrapping composition will contain from 2 to 30% fat, by weight of the composition, preferably from 5 to 25%. The fat functions to enhance the development of the fried taste, texture and appearance of the baked comestible.

The farinaceous material content of the composition may comprise a flour prepared from wheat, rice, corn or oats or mixtures of these grains. By-products from other food operations in the nature of cereal fines or flakes, breading and pastry crumbs are also suitable alone or in combination with the above-noted flours. The farinaceous material should not impart any discernible flavor not compatible with the foodstuff to be wrapped. The coating and wrapping composition of this invention will contain 25 to 75% farinaceous material by weight of the composition, preferably from 30 to 55%. The farinaceous materials are generally insoluble and function as bulking and filler materials to provide bulk to the coating and aid in crispness development which is essential in obtaining the texture and mouthfeel characteristics of fried, preferably pan fat-fried like foods.

The particle size of the farinaceous material is not overly critical; however, it should be of a fineness to assure good blending with the sheet forming material. Broadly, the crumbs or fines used in this invention have a particle size range wherein a maximum of 5% by weight of the crumbs or fines are retained on a U.S. standard 10 mesh screen and a minimum of 50% by weight of the crumbs or fines are retained on a U.S. standard 100 mesh screen. A typical screen fraction for bread or pastry crumbs is 2% of U.S. standard No. 14 mesh, 70% through U.S. No. 35 and 10% maximum through U.S. No. 100. With cereal fines and grain flours a typical screen fraction is 4% on U.S. No. 14, 45% on U.S. No. 35 and 20% on U.S. No. 100 screen.

Suitable and conventional flavoring and flavor-enhancing ingredients may be incorporated in the composition such as salt, sugar, monosodium glutamate, mustard powder, malted barley, celery seed, paprika, garlic, pepper, natural hickory smoked flavor, and other flavors whether natural or synthetic. These ingredients, by their very nature, are employed in relatively small quantities, the combined flavor-enhancing level ranging between 3% to about 18% of the total prepared food coating. Any colors or food-dyes, such as those described in U.S. Pat. No. 3,586,512, may also be incorporated in the wrap combination to impart the desired color to the ultimately baked food products.

The gelatin component of the coating and wrapping composition functions to provide a solid matrix for the fat and farinaceous material and also gives the product pliability and flexibility. The coating and wrapping composition will contain from 0.5 to 40% gelatin by weight of the composition, preferably from 1 to 20%. During baking, the gelatin solubilizes to form a continuous film around the comestible. For the preparation of the product of this invention gelatin possessing a bloom strength in excess of 50 should be utilized. The time and temperature at which the gelatin will solubilize during baking is dependent on the gelatin bloom. A low bloom (e.g., 60) solubilizes when the surface temperature reaches approximately 90° F. (32° C.) and a high bloom (e.g., 215) solubilizes at approximately 120° F. (49° C.). The film formed when the gelatin solubilizes during baking appears to retard moisture transmission from the comestible thereby allowing the comestible surface-coating interface to become crisp during the baking cycle and retain its crispness until it is consumed.

A gelling agent, in addition to gelatin, may be added to aid in the formation of the gelatin solid matrix and create pliability in the wrapping and coating composition of this invention. This gelling agent will also promote crispness in the baked comestible. Suitable gelling agents include pectin, caseinates, milk solids, soy protein concentrates, egg solids, protein micellar mass, vital wheat gluten, and gums such as carboxymethylcellulose, alginates, gum arabic and xanthan gum.

Although the thickness of the sheet material is not overly critical, it should range from about 0.5 mm to about 5 mm in order to yield a product capable of being easily handled and utilized by the consumer. Upon baking, the sheet melts (dissolves) allowing the fat and gelatin to uniformly and completely coat the food with a portion of the fat and gelatin being absorbed by the foodstuff leaving the baked foodstuff coated with the particulate farinaceous material and dye and flavor-enhancing agents resulting in an appearance, texture and taste of a fried food.

The sheet composition may additionally contain an $A_W$ lowering agent such as sodium chloride, potassium chloride, sodium citrate, potassium citrate, glycerin or combinations thereof in an amount sufficient to stabilize the said composition against microbiological contamination in the presence of 30% to 50% moisture, i.e., "intermediate moisture," based on the weight of the composition. Optionally, the sheet material may be stored in refrigerated or frozen form to reduce microbiological contamination.

The sheet is formed by suspending the particulate farinaceous material in a hot aqueous suspension sufficient to dissolve the gelatin and fat (e.g., temperature range of from 90° F. (32° C.) to 150° F. (66° C.)) followed by forming the resulting coherent mass into a sheet form and cooling. The product is a self-supporting, pliable sheet material which may be easily and conveniently wrapped around any suitable foodstuff prior to baking.

The product may be utilized to wrap fresh or frozen meat, fish, poultry, or vegetables or fruit to produce a fried food color, appearance, taste and odor when the foodstuffs are baked in an oven.

The invention is illustrated by the following non-limiting examples.

EXAMPLE 1

| Formulation | Weight in Grams |
| --- | --- |
| Water | 24.0 |
| Glycerin | 24.0 |
| Hydrogenated Vegetable Oil | 21.3 |
| Cereal Fines | 15.8 |
| Bread Crumbs | 15.8 |
| Wheat Flour | 10.6 |
| Gelatin (Bloom Strength 240) | 7.2 |
| Salt | 2.0 |
| Color Pre-mix | 0.2 |
| TOTAL | 120.9 |

The gelatin is mixed with the water and glycerin and allowed to hydrate. The mixture is heated to 120° F. (49° C.) to dissolve the gelatin. The other ingredients are added and intimately blended with the gelatin solution. The coherent mass which results is pressed into thin sheets (3 mm.) and allowed to cool to room temperature.

The sheets were pliable and were utilized to wrap fish pieces which were then baked at 450° F. (232° C.) for 20 minutes yielding cooked fish pieces having the appearance, odor, taste and characteristics of deep fat-fried fish.

EXAMPLE 2

| Formulation | Weight in Grams |
| --- | --- |
| Graham Wafer Crumbs | 170.1 |
| Water | 100.0 |
| Sesame Seeds | 56.7 |
| Wheat Germ | 56.7 |
| Shortening | 30.0 |
| Sugar | 20.0 |
| Gelatin (Bloom Strength 215) | 5.0 |

-continued

| Formulation | Weight in Grams |
|---|---|
| TOTAL | 438.5 grams |

The gelatin and sugar were added to the 100 grams of water. The mixture was heated to 120° F. (49° C.) to dissolve the gelatin. The other ingredients are added and intimately blended with the gelatin and sugar solution. The product was rolled into thin (1.5 to 2.0 mm) pliable sheets and cooled.

The pliable sheets were wrapped around fruit pieces. The coated fruit wedges were placed in a pan and baked. The product had a crisp hard coating with a fried taste, texture and appearance and the integrity of the coating was maintained on baking. The underside of the cooled coated fruit was moist due to seepage of fruit juices.

I claim:

1. A coating and wrapping composition in pliable sheet form which upon wrapping a foodstuff and baking provides a fat-fried taste, texture and appearance, comprising an intimate admixture of a fat, water and a particulate farinaceous material suspended in a pliable sheet form by a gelatin matrix, the gelatin having a bloom strength of at least 50.

2. The composition of claim 1 wherein said sheet contains from 0.5 to 40% gelatin by weight of the composition, from 25 to 75% farinaceous material by weight of the composition, from 2 to 30% fat by weight of the composition and from 10% to 70% water by weight of the composition.

3. The composition of claim 2 wherein said sheet contains from 1 to 20% gelatin, 30 to 55% farinaceous material, 5 to 25% fat and 15 to 40% water.

4. The composition of claims 2 or 3 wherein said particulate farinaceous material is chosen from the group consisting of flours, cereal fines, breadings, pastry crumbs and combinations thereof.

5. The composition of claims 2 or 3 wherein said sheet has a thickness of from 0.5 mm to about 5 mm.

6. The composition of claims 2 or 3 additionally containing an $A_W$ lowering agent in an amount sufficient to stabilize the said composition against microbiological contamination in the presence of 30% to 50% moisture based on the weight of the composition.

7. The composition of claims 2 or 3 in refrigerated form.

8. The composition of claims 2 or 3 in frozen form.

9. The composition of claims 2 or 3 additionally containing a gelling agent.

10. A method for forming the composition of claims 2 or 3 comprising mixing said particulate farinaceous material with a hot aqueous suspension of a fat and gelatin; molding said suspension mixture into sheets; and cooling said sheets.

11. A foodstuff to be baked wrapped with the sheet composition of claims 2 or 3 to impart to said baked foodstuff a fried appearance, taste and texture.

12. A method of baking a foodstuff to impart thereto a fried appearance, taste and texture comprising:
enveloping said foodstuff in an edible coating and wrapping composition in a pliable sheet form said composition comprising an intimate admixture of a fat, water and particulate materials suspended in said pliable sheet form by a gelatin matrix said composition comprising from 0.5 to 40% gelatin by weight of the composition, said gelatin having a bloom strength of 50 or greater, from 25 to 75% farinaceous material by weight of the composition, from 2 to 30% fat by weight of the composition, and from 10 to 70% water by weight of the composition; and
baking said enveloped foodstuff for a time sufficient to cook said foodstuff and melt said gelatin and fat and impart to said foodstuff a fat-fried taste, texture and appearance.

13. The method of claim 12 wherein said edible coating and wrapping composition contains from 1 to 20% gelatin, 30 to 55% farinaceous material, 5 to 25% fat and 15 to 40% water.

14. The method of claim 12 wherein said particulate farinaceous material is chosen from the group consisting of flours, cereal fines, breadings, pastry crumbs and combinations thereof.

15. The method of claim 12 wherein said edible coating and wrapping composition sheet has a thickness of from 0.5 mm to about 5 mm.

16. The method of claim 12 wherein said edible coating and wrapping composition additionally contains an $A_W$ lowering agent in an amount sufficient to stabilize the said composition against microbiological contamination in the presence of 30% to 50% moisture based on the weight of the composition.

17. The method of claim 12 wherein said edible coating and wrapping composition additionally contains a gelling agent.

* * * * *